United States Patent
Tsutsumi et al.

(10) Patent No.: US 9,427,924 B2
(45) Date of Patent: Aug. 30, 2016

(54) DIRECT ACTING MECHANISM OF TIRE CURING DEVICE AND CENTRAL MECHANISM OF TIRE CURING DEVICE

(71) Applicant: ICHIMARU-GIKEN CO., LTD., Chikugo-shi, Fukuoka (JP)

(72) Inventors: Kazunori Tsutsumi, Chikugo (JP); Hironobu Ichimaru, Chikugo (JP)

(73) Assignee: ICHIMARU-GIKEN CO., LTD., Chikugo-Shi (JP)

( * ) Notice: Subject to any disclaimer, the term of this patent is extended or adjusted under 35 U.S.C. 154(b) by 0 days.

(21) Appl. No.: 14/889,525

(22) PCT Filed: May 16, 2013

(86) PCT No.: PCT/JP2013/063644
§ 371 (c)(1),
(2) Date: Nov. 6, 2015

(87) PCT Pub. No.: WO2014/184921
PCT Pub. Date: Nov. 20, 2014

(65) Prior Publication Data
US 2016/0121570 A1    May 5, 2016

(51) Int. Cl.
*B29D 30/06* (2006.01)

(52) U.S. Cl.
CPC ....... *B29D 30/0654* (2013.01); *B29D 30/0645* (2013.01); *B29D 2030/0655* (2013.01); *B29D 2030/0659* (2013.01)

(58) Field of Classification Search
CPC .................. B29D 30/0645; B29D 2030/0675
See application file for complete search history.

(56) References Cited

U.S. PATENT DOCUMENTS

| | | | | |
|---|---|---|---|---|
| 3,659,973 A * | 5/1972 | Yoshida | ............ | B29D 30/0645 425/29 |
| 5,776,507 A * | 7/1998 | Ureshino | ........... | B29D 30/0645 425/29 |
| 5,798,123 A * | 8/1998 | Mitamura | .......... | B29D 30/0645 425/29 |
| 6,841,102 B2 * | 1/2005 | Cole | .................. | B29D 30/0645 264/315 |
| 7,513,763 B1 * | 4/2009 | Singh | ................. | B29D 30/0645 425/171 |

(Continued)

FOREIGN PATENT DOCUMENTS

| JP | H10-165876 A | 6/1998 |
|---|---|---|
| JP | 2000-117743 A | 4/2000 |

(Continued)

OTHER PUBLICATIONS

International Search Report received for PCT Patent Application No. PCT/JP2013/063644 mailed on Jul. 23, 2013, 6 pages (3 pages of English translation and 3 pages of International Search Report).

*Primary Examiner* — James Mackey

(57) ABSTRACT

Provided is a direct acting mechanism of a tire curing device which can sufficiently perform positional control of a bladder extension height and a shaping height, etc., and is applicable to tires of different sizes. A hydraulically-driven central mechanism 1 as an example of a central mechanism of a tire curing device to which the present invention is applied includes a bag head 2 and a hydraulic cylinder 3. A cylinder tube 4 is formed to be thick-walled, and near the outer circumferential surface thereof, a sensor hole portion 7 is provided. The sensor hole portion 7 penetrates to the bottom surface side of the cylinder tube 4, and a linear sensor 8 with heat resistance and flexibility is inserted therein.

11 Claims, 5 Drawing Sheets

(56) References Cited

U.S. PATENT DOCUMENTS

2011/0126703 A1 6/2011 Terasaki
2012/0260797 A1 10/2012 Ishibashi et al.

FOREIGN PATENT DOCUMENTS

| JP | 2011-112205 A | 6/2011 |
| JP | 2012-219967 A | 11/2012 |

* cited by examiner

DIRECT ACTING MECHANISM OF TIRE CURING DEVICE AND CENTRAL MECHANISM OF TIRE CURING DEVICE

CROSS REFERENCE TO RELATED APPLICATIONS

This patent application is a U.S. national stage application under 35 U.S.C. §371 of International Patent Application No. PCT/JP2013/063644 filed on May 16, 2013. The International Application was published in Japanese on Nov. 20, 2014, as International Publication No. WO 2014/184921 A1 under PCT Article 21(2).

TECHNICAL FIELD

The present invention relates to a direct acting mechanism of a tire curing device and a central mechanism of a tire curing device. Specifically, the present invention relates to a direct acting mechanism of a tire curing device and a central mechanism of a tire curing device which can sufficiently perform positional control of a bladder extension height and a shaping height, and are applicable to tires of different sizes.

BACKGROUND ART

In tire manufacturing, a green tire molded into a shape close to a shape of a completed product in advance is put into a mold and pressurized and heated. At this time, a bladder provided inside the mold is expanded and brought into close contact with the inner surface of the green tire, and curing is performed.

There is a type of tire curing device that has a bee drift mechanism that includes a knock-out lever joined to an up-down moving cylinder and provided on the bottom portion of a fluid pressure cylinder, and moves up-down the fluid pressure cylinder via the knock-out lever, and this type is most frequently used. With this type of tire curing device, the fluid pressure cylinder is moved up by the knock-out lever, and a tire after being cured and molded is unloaded.

In the curing process, the central mechanism of the tire curing device needs to be driven by a power source such as a liquid pressure cylinder and positioned at predetermined height positions. The first height position of the predetermined height positions is a maximally extended position of the bladder when the green tire is loaded to the tire curing device, and the second height position is a height position when shaping.

The maximally extended position of the bladder is determined according to each type of bladder of different sizes, and the height when shaping is determined according to the size of the tire to be cured.

In this situation, there are central mechanisms of tire curing devices which can perform positional control of the bladder extension height and the shaping height, etc., and for example, a central mechanism is proposed in Patent Document 1.

Here, in Patent Document 1, a central mechanism 100 as shown in FIG. 5 is described. The central mechanism 100 includes a bladder 101, a fluid pressure cylinder 102, and a piston 103. The central mechanism 100 further includes a magnet 104 attached to the piston 103 and a sensor rod 105 inserted from the bottom surface of the piston 103, and on the bottom portion of the fluid pressure cylinder 102, a sensor main body 106 is disposed.

The central mechanism 100 further includes a control means 107 that actuates and moves up-down the fluid pressure cylinder based on position detection information of the sensor main body 106.

PRIOR ART DOCUMENT

Patent Document

Patent Document 1: Japanese Published Unexamined Patent Application No. 2000-117743

SUMMARY OF THE INVENTION

Problem to be Solved by the Invention

However, in the central mechanism described in Patent Document 1, the sensor main body is disposed at the center of the bottom portion of the fluid pressure cylinder. In a tire curing device including a bee drift mechanism, the stroke of the central mechanism is limited and shortened by the volume of the sensor main body. Shortening of the stroke poses a problem in that the size of the usable bladder is limited, and depending on the kind of tire, the tire cannot be cured.

To secure the stroke of the central mechanism, a change in structure of the knock-out lever or the lever connecting portion is also possible. However, this makes it impossible to use the equipment of the bee drift mechanism designed with an existing size, and it becomes difficult to use the device for general purposes. In addition, the entire structure is increased in size by the secured stroke of the central mechanism, and this causes a disadvantage that the device cannot be made compact.

Since the central mechanism described in Patent Document 1 has a structure in which the sensor is disposed above the knock-out lever, the sensor cannot be easily replaced, and it becomes difficult to excellently maintain the position detection function to control positioning of the central mechanism.

In addition, since the sensor is disposed inside the fluid pressure cylinder, use of a rod-shaped sensor with pressure resistance is required, and this causes inconvenience that the kinds of usable sensors are limited.

The present invention was developed in view of the above-described circumstances, and an object thereof is to provide a direct acting mechanism of a tire curing device and a central mechanism of a tire curing device which can sufficiently perform positional control of a bladder extension height and a shaping height, and are applicable to tires of different sizes.

Means for Solving the Problem

In order to achieve the above-described object, a direct acting mechanism of a tire curing device according to the present invention includes a clamp portion capable of clamping a bladder that can expand and contract, a cylinder that is disposed below the clamp portion and formed into a hollow shape, a center post rod that is disposed in the hollow region of the cylinder, movable in the vertical direction, and has an upper end attached to the clamp portion, a sensor portion that is disposed in a hole portion formed by opening the bottom surface to the outside in a portion of the region between the hollow region and the outer circumferential surface of the cylinder, and capable of detecting magnetism, and a magnetic magnet portion attached to the center post rod.

Here, by the clamp portion capable of clamping a bladder that can expand and contract, a bladder to cure a tire can be clamped. That is, the bladder can be clamped and interlocked with movements of the direct acting mechanism.

In addition, a structure to be driven in the vertical direction can be provided inside the cylinder by the cylinder that is disposed below the clamp portion and formed into a hollow shape and the center post rod that is disposed in the hollow region of the cylinder and movable in the vertical direction. That is, a structure to position the direct acting mechanism at a predetermined height can be provided.

In addition, by the center post rod that is movable in the vertical direction and has an upper end attached to the clamp portion, the clamp portion can be moved in the vertical direction. That is, the bladder can be extended in the vertical direction.

In addition, since the sensor portion is disposed in a hole portion formed in a portion of the region between the hollow region and the outer circumferential surface of the cylinder, a sensor can be disposed near the outer circumference of the cylinder. That is, the stroke of the center post rod is not limited by the presence of the sensor, and multiple bladders of different sizes can be used.

In addition, since the sensor portion is disposed in a hole portion formed by opening the bottom surface to the outside in a portion of the region between the hollow region and the outer circumferential surface of the cylinder, a sensor other than a sensor with pressure resistance can also be used. That is, the sensor is hardly influenced by hydraulic pressure, etc., that serves as a driving force to drive the cylinder, and for example, a sensor with flexibility can be disposed.

In addition, since the sensor portion is disposed in a hole portion formed by opening the bottom surface to the outside in a portion of the region between the hollow region and the outer circumferential surface of the cylinder, a sensor can be inserted or discharged from the bottom surface of the cylinder. That is, a sensor can be easily installed and replaced.

In addition, by the sensor portion capable of detecting magnetism, position detection is enabled by interaction with a member with magnetism.

In addition, by the sensor portion capable of detecting magnetism and the magnetic magnet portion attached to the center post rod, a height position of the center post rod can be detected.

In addition, in a case where the magnet portion has a ring shape, and is attached to the outer circumferential surface of the center post rod, the magnet portion is always positioned near the sensor portion. That is, even when the center post rod is structured to rotate in the circumferential direction, the position thereof can be accurately detected.

In addition, in a case where an up-down moving means that is in contact with the lower end of the cylinder and moves the cylinder in the vertical direction is provided, the cylinder itself can be driven and moved up and down. That is, by providing a bee drift mechanism, a tire after being cured and molded can be easily unloaded.

In addition, in a case where the center post rod is fixed so as not to rotate in the circumferential direction, and the magnet portion is attached to a position near the sensor portion of the center post rod, by only attaching the magnet portion to a portion of the center post rod, the position of the center post rod can be accurately detected.

In addition, in a case where a plurality of the magnet portions are attached to the outer circumferential surface of the center post rod, and the magnet portions adjacent to each other are at a predetermined interval, the quantity of magnets necessary for position detection can be reduced.

Further, in order to achieve the above-described object, a central mechanism of a tire curing device according to the present invention includes a bladder that can expand and contract, a clamp portion capable of clamping the bladder, a cylinder that is disposed below the clamp portion, has a hollow shape, and has a hole portion that has a bottom surface opened to the outside and is formed in the vertical direction, a center post rod that is disposed in the hollow region of the cylinder, is movable in the vertical direction, and has an upper end attached to the clamp portion, a sensor portion that is disposed in the hole portion of the cylinder and capable of detecting magnetism, and a magnetic magnet portion attached to the center post rod.

Here, by the bladder that can expand and contract, a tire can be cured. That is, by bringing the bladder into close contact with the inner circumference of a green tire and expanding it, the tire can be cured and molded.

In addition, by the cylinder that is disposed below the clamp portion and formed into a hollow shape, and the center post rod that is disposed in the hollow region of the cylinder and movable in the vertical direction, a structure to be driven in the vertical direction can be provided inside the cylinder. That is, a structure to position the direct acting mechanism at a predetermined height position can be provided.

In addition, by disposing the sensor portion in the hole portion formed in a portion of the region between the hollow region and the outer circumferential surface of the cylinder, a sensor can be disposed near the outer circumference of the cylinder. That is, the stroke of the center post rod is not limited by the presence of the sensor, and multiple bladders of different sizes can be used.

Effects of the Invention

The direct acting mechanism of a tire curing device according to the present invention can sufficiently perform positional control of a bladder extension height and a shaping height, etc., and is applicable to tires of different sizes.

In addition, the central mechanism of a tire curing device according to the present invention can sufficiently perform positional control of a bladder extension height and a shaping height, etc., and is applicable to tires of different sizes.

BEST MODE FOR CARRYING OUT THE INVENTION

Hereinafter, description of embodiments of the present invention relating to a central mechanism of a tire curing device is given with reference to the drawings, for understanding of the present invention.

Figure 1:
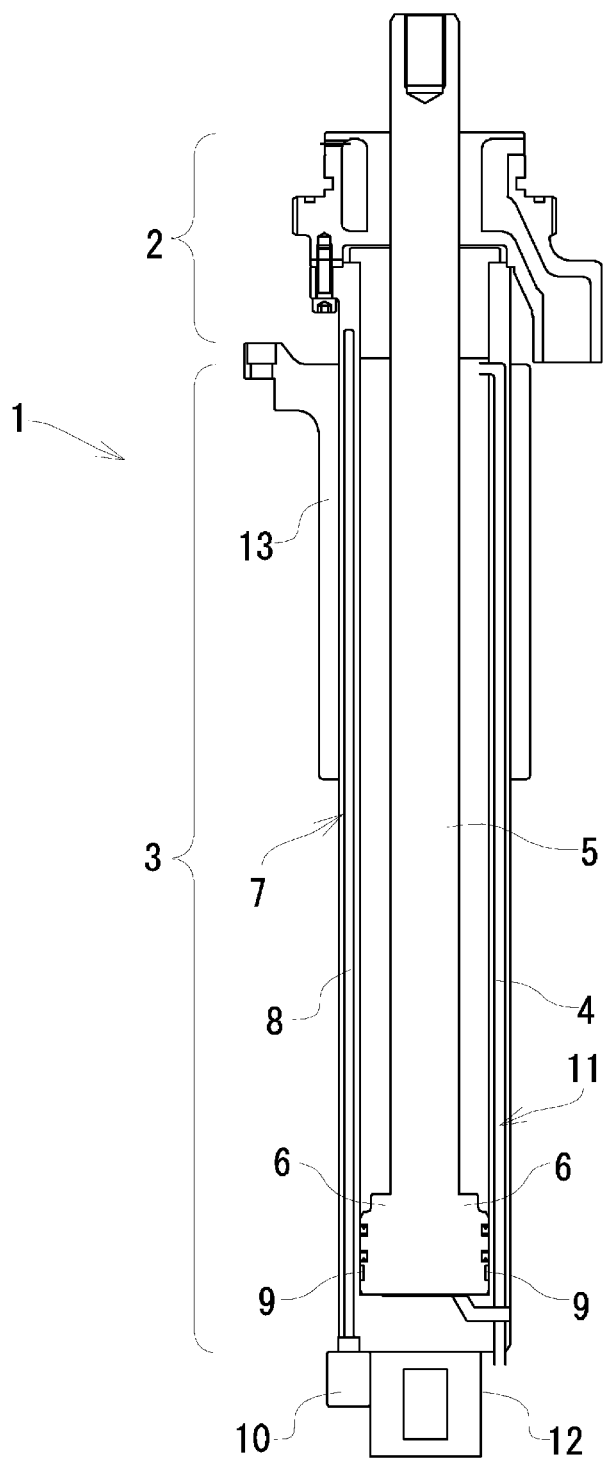
FIG. 1 is a schematic view showing an example of a central mechanism of a tire curing device to which the present invention is applied.
Figure 2:
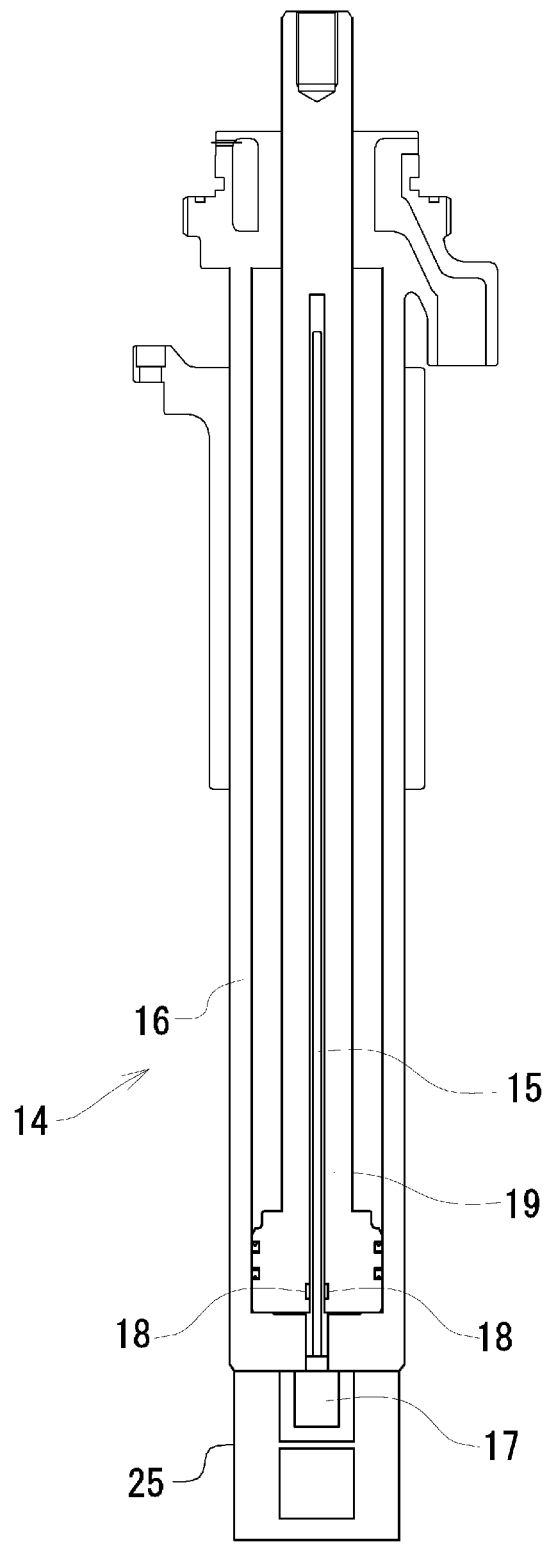
FIG. 2 is a schematic view showing an example of a conventional central mechanism of a tire curing device.

FIG. 1 is a schematic view showing an example of a central mechanism of a tire curing device to which the present invention is applied. FIG. 2 is a schematic view showing an example of a conventional central mechanism of a tire curing device.

Here, as shown in FIG. 1, a hydraulically-driven central mechanism 1 that is an example of a central mechanism of a tire curing device to which the present invention is applied includes a bag head 2 and a hydraulic cylinder 3.

In addition, the hydraulically-driven central mechanism 1 includes a bladder (not shown) that can expand and contract by being supplied with a fluid inside.

The bag head 2 has a supply port and a discharge port for a curing medium, and is disposed on the upper portion of the hydraulically-driven central mechanism 1. The hydraulic cylinder 3 is fixed to the lower portion of the bag head 2.

In addition, the hydraulic cylinder 3 includes a cylinder tube 4, and in the central region of the cylinder tube, a center post rod 5 that can be moved up and down by a hydraulic pressure. To the tip end side of the center post rod 5, a bladder clamp ring (not shown) to clamp a bladder is attached.

According to up-down movements of the center post rod 5, the extension state of the bladder and the height position of the hydraulically-driven central mechanism 1 change, and the mechanism can be positioned at a desired height position. To the bottom portion side of the center post rod 5, a cylindrical piston 6 to be subjected to a hydraulic pressure for driving is attached.

The cylinder tube 4 is formed to be thick-walled, and near the outer circumferential surface thereof, a sensor hole portion 7 is provided. The sensor hole portion 7 penetrates to the bottom surface side of the cylinder tube 4, and a linear sensor 8 with heat resistance and flexibility is inserted therein.

Along the outer circumferential surface of the cylindrical piston 6, a ring-shaped magnet 9 is attached. By detecting a pulsed voltage that a linear sensor main body 10 containing a receive coil generates according to the position of this magnet 9, the position of the center post rod 5 can be detected. The pulsed voltage is converted into an analog signal and output by a detection mechanism through the linear sensor main body 10.

The cylinder tube 4 includes, near the outer circumferential surface thereof, a water channel hole portion 11 for water to be used to drive the center post rod 5. On the bottom portion of the cylinder tube 4, a removable arm portion 12 that is attachable to and removable from a knock-out lever is provided. In addition, a knock-out lever (not shown) joined to a drive source such as a cylinder via the arm portion 12 is disposed.

The hydraulic cylinder 3 is provided with a cylinder guide 13 that guides up-down movements of the hydraulic cylinder 3 via the knock-out lever.

Here, the kind of bladder usable for the hydraulically-driven central mechanism 1 is not particularly limited. The hydraulically-driven central mechanism 1 can be used by being attached to existing multiple bladders present according to the kinds and sizes of tires.

The kind of sensor is not limited, and a sensor is sufficiently usable as long as it can be inserted through the sensor hole portion 7.

The linear sensor 8 does not necessarily have to be heat-resistant. However, a linear sensor 8 with heat resistance is preferably used since it can maintain highly accurate position detection ability in severe temperature environments.

The magnet 9 does not necessarily have to have a ring shape attached to the piston 6. However, the magnet 9 preferably has a ring shape attached to the piston 6 since this enables highly accurate position detection even when the center post rod 5 rotates in the circumferential direction.

The cylinder tube 4 does not necessarily have to include the water channel hole portion 11. However, the cylinder tube 4 preferably includes the water channel hole portion 11 since this makes it unnecessary to provide a water channel for driving the hydraulic cylinder 3 by attaching a separate member, and enables the hydraulically-driven central mechanism 1 to be downsized.

Here, a hydraulically-driven central mechanism is described by way of example. However, it does not necessarily have to be limited to one including the center post rod 5 that can be moved up and down by a hydraulic pressure. For example, an oil hydraulic cylinder can also be sufficiently adopted as long as the center post rod 5 is arranged so as to be movable up and down.

Hereinafter, description of usage patterns of a direct acting mechanism of a tire curing device and a central mechanism of a tire curing device to which the present invention is applied is given for understanding of the present invention.

Movements of the central mechanism in a tire curing process and tire unloading are as follows.

First, to insert a green tire before being cured to a bladder, the hydraulic cylinder 3 is driven to put the center post rod 5 into a maximally extended state. The bladder is extended via the bladder clamp ring, and by contracting the bladder by vacuum, the radius of the bladder decreases. Accordingly, the tire can be disposed outside the bladder.

At this time, the position of the center post rod 5 is detected according to relative positions of the linear sensor 8 and the magnet 9, and the center post rod can be driven so as to be positioned at a maximally extended position.

Next, a loader grasping the green tire descends, and disposes the green tire outside the bladder. When coming to a position of a shaping height corresponding to the tire size, the loader stops.

Subsequently, the center post rod 5 is moved down by the hydraulic cylinder 3, and simultaneously, a shaping low-pressure gas such as vapor or gas, etc., is put into the inside of the bladder to expand the bladder. While the bladder expands, the center post rod 5 is positioned at an intermediate position for shaping.

In the process of shaping, by expanding the bladder, the outer circumferential surface of the bladder is brought into close contact with the inner circumferential surface of the green tire, and air between the tire and the bladder is removed. By positioning the center post rod 5 at the central position, the bladder can be easily expanded.

At this time, the position of the center post rod 5 is detected according to relative positions of the linear sensor 8 and the magnet 9, and the center post rod can be driven to be positioned at the intermediate position for shaping.

Next, a container of the curing device inside which a mold for mold-clamping the green tire from the outside is disposed descends, and pushes the center post rod 5 down. In addition, the expanded green tire is covered by the mold from the upper, lower, right, and left sides.

Vapor or gas at a high temperature and high pressure is put into the inside of the bladder, and the green tire is pressed against the mold via the bladder. By heat from the bladder and the container, the tire is cured and molded.

After curing and molding the tire, the inside of the bladder is depressurized, and then the mold is removed from the tire. By moving up the hydraulic cylinder 3 via the knock-out lever disposed on the bottom portion of the hydraulic cylinder 3, the position of the center post rod 5 moves up. Accordingly, a claw of a tire unloader to be used to unload the tire can be inserted under the tire.

Subsequently, while the center post rod 5 is moved up, the pressure inside the bladder is made negative by vacuum to contract the bladder. In addition, the knock-out lever is moved down, and the cured tire is taken out by the tire unloader.

The flow of the tire curing process and tire unloading by the central mechanism of a tire curing device to which the present invention is applied is described above.

Thus, in the hydraulically-driven central mechanism 1, the height position of the center post rod 5 can be changed and set to a desired height position by the hydraulic cylinder 3. By using the linear sensor 8 and the magnet 9 as a position detection mechanism, the height position can be detected.

In addition, since the cylinder tube 4 is formed to be thick-walled, and the sensor hole portion 7 is provided near the outer circumferential surface of the hydraulic cylinder 3, the linear sensor 8 can be disposed in this sensor hole portion 7.

Since the linear sensor 8 is not positioned on the movement line in the vertical direction of the center post rod 5, the stroke of the hydraulically-driven central mechanism 1 is not limited. That is, multiple bladders of different sizes can be used, and accordingly, the range of applications of tires capable of being cured can be broadened.

Since the cylinder tube 4 is formed to be thick-walled, the sensor disposed in the sensor hole portion 7 can be sufficiently protected from pressure, etc. Accordingly, the sensor is not limited to one with pressure resistance, and the range of choices of usable sensors is enlarged.

In addition, no other members are attached to the portion of the sensor hole portion 7 in which the linear sensor 8 is inserted and the position to which the linear sensor main body 10 is attached, so that the linear sensor 8 and the linear sensor main body 10 can be easily replaced. Accordingly, maintainability of the position detection function of the hydraulically-driven central mechanism 1 can be improved.

In addition, by using the ring-shaped magnet 9, a structure in which the positions of the linear sensor 8 and the magnet 9 are close to each other can be obtained. Accordingly, even in a structure in which the center post rod 5 rotates in the circumferential direction, the linear sensor 8 and the magnet 8 are always close to each other, so that the magnetism of the magnet 9 is not weakened. That is, highly accurate position detection ability can be maintained.

In addition, the central mechanism can be used together with a bee drift mechanism via the knock-out lever, so that an existing bee drift mechanism used for a conventional central mechanism can be used as it is to unload a tire.

In addition, since the linear sensor 8 is disposed inside the cylinder tube 4, it does not block up-down movements of the hydraulic cylinder 3 via the cylinder guide 13. If the linear sensor 8 is disposed on the cylinder guide 13 side outside the hydraulic cylinder 3, it blocks up-down movements of the hydraulic cylinder 3, and makes it difficult to use the hydraulically-driven central mechanism 1.

As described above, a conventional central mechanism 14 of a tire curing device is shown in FIG. 2, and is compared with the hydraulically-driven central mechanism 1. In the central mechanism 14, a linear sensor 15 is disposed at the center of the hydraulic cylinder 16, and a linear sensor main body 17 is disposed on the bottom portion. The magnet 18 is disposed at the center of a center post rod 19. On the bottom portion of the cylinder tube 4, an arm portion 25 that is attachable to and removable from a knock-out lever is provided.

In this structure of the central mechanism 14, since the linear sensor 15 is disposed at the center of the hydraulic cylinder 16, the stroke of the center post rod 19 is limited to be short. As a result, sizes of usable bladders are limited, and depending on the kind of tire, the tire cannot be cured and molded.

In addition, since the linear sensor 15 is disposed at the center of the hydraulic cylinder 16, it is easily influenced by a hydraulic pressure, etc., to drive the cylinder. Therefore, to make the position detection function highly accurate, the choice of the kind of sensor that has pressure resistance and hardness is required.

Subsequently, other embodiments of the present invention are described.

Figure 3:
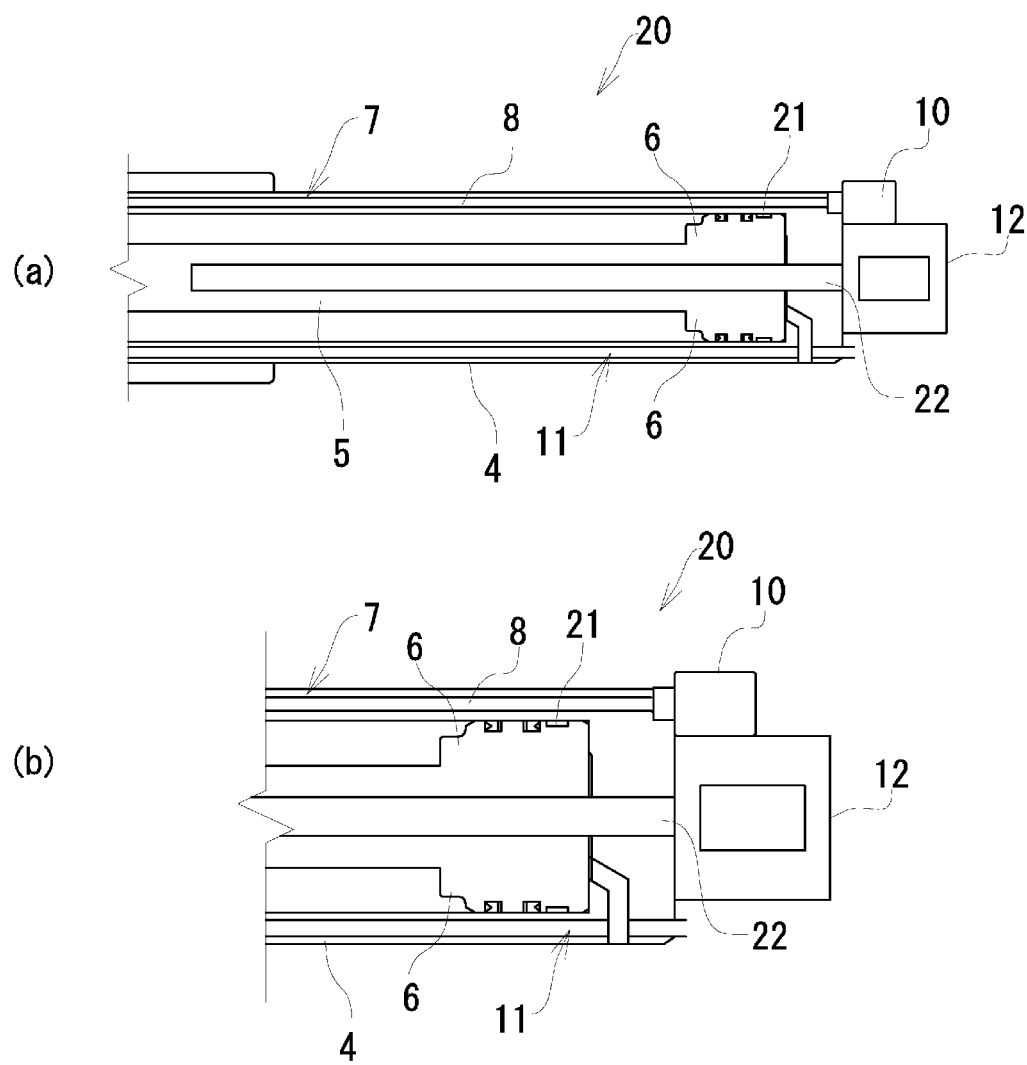
FIG. 3 (*a*) is a schematic view showing an embodiment (1) of a central mechanism of a tire curing device, and FIG. 3 (*b*) is a partial enlarged view of the same.
Figure 4:
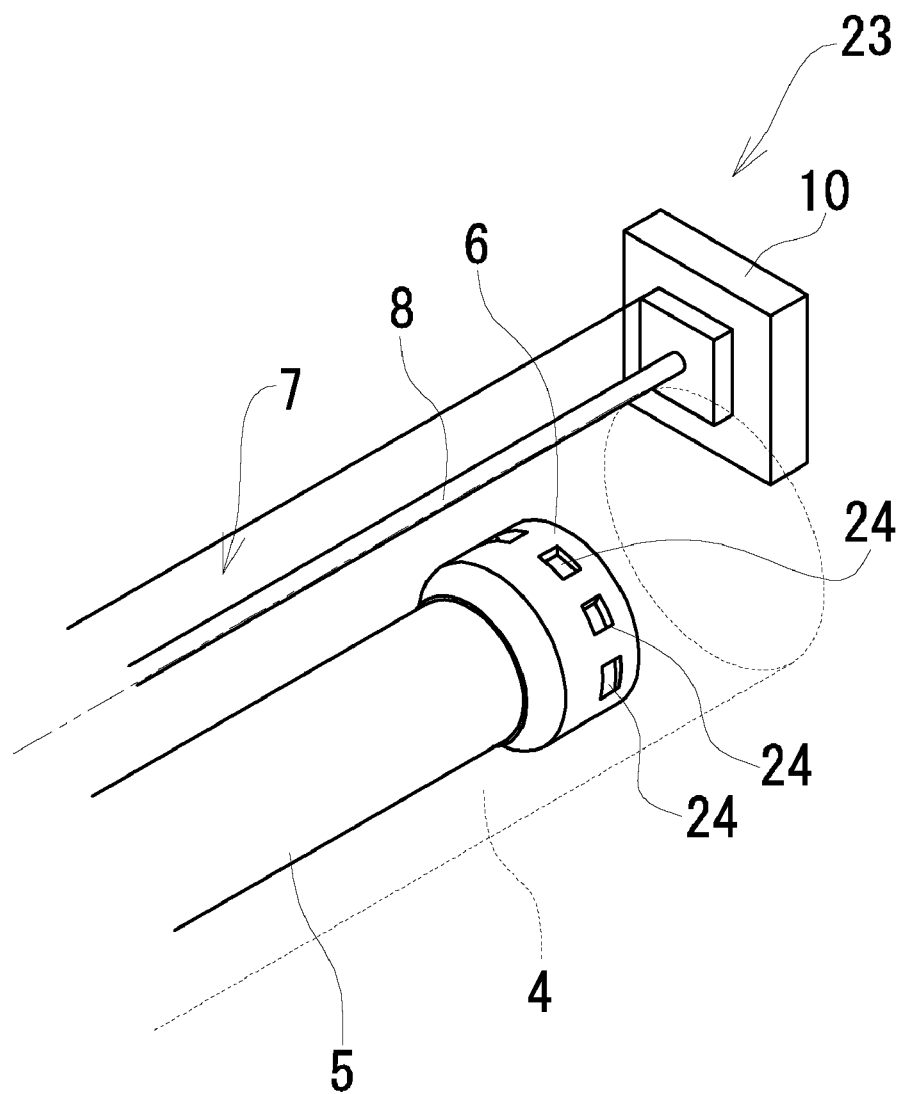
FIG. 4 is a schematic view showing an embodiment (2) of the central mechanism of a tire curing device.
Figure 5:
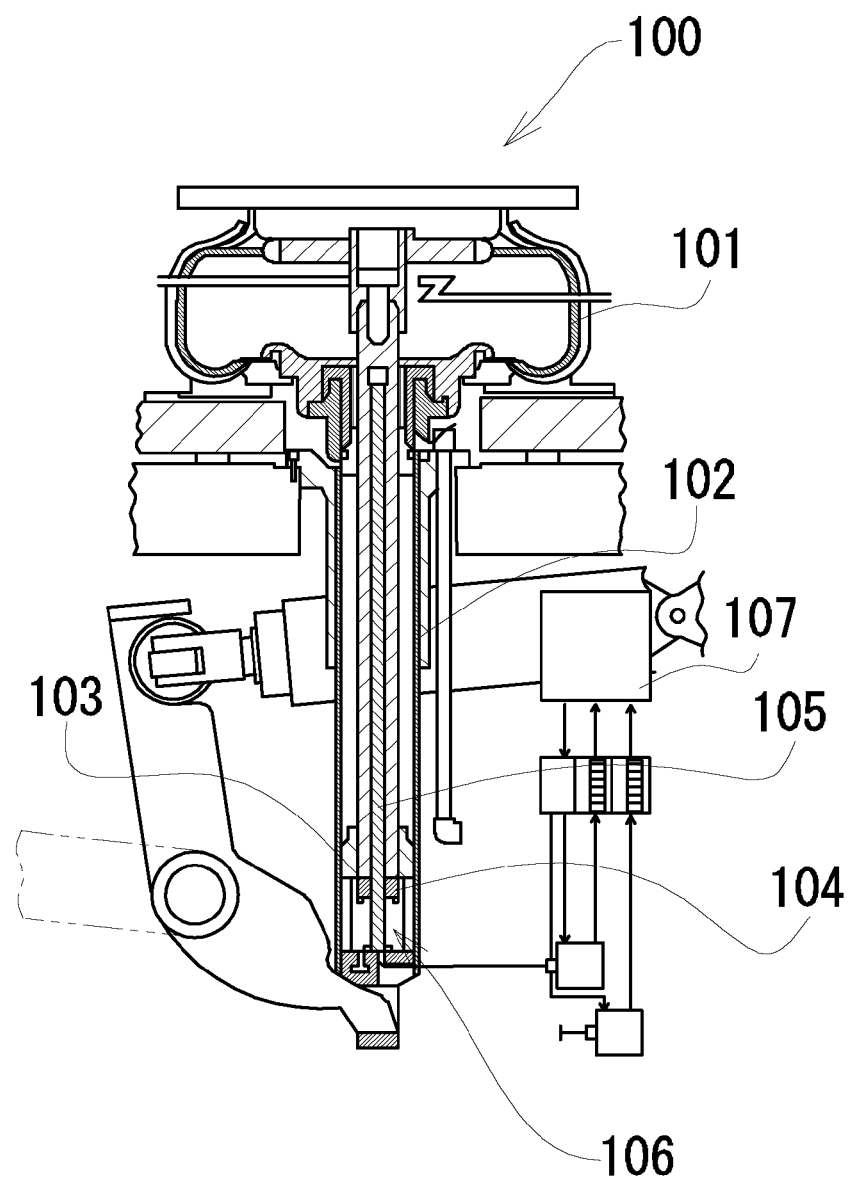
FIG. 5 is a schematic view showing a conventional central mechanism of a tire curing device.

FIG. 3(a) is a schematic view showing an embodiment (1) of a central mechanism of a tire curing device, and FIG. 3(b) is a partial enlarged view of the same. FIG. 4 is a schematic view showing an embodiment (2) of the central mechanism of a tire curing device.

In the central mechanism 20 of a tire curing device shown in FIG. 3(a), a magnet 21 is attached to the linear sensor 8 side of the piston 6 attached to the center post rod 5. A fixed member 22 is inserted from the bottom portion of the center post rod 5 toward the bladder side, and fixed. The reference signs of other components are the same as those in the hydraulically-driven central mechanism 1.

In the central mechanism 20, since the center post rod 5 is fixed by the fixed member 22, the center post rod does not rotate in the circumferential direction, and the magnet 21 is always positioned close to the linear sensor 8. Accordingly, accurate position detection is possible. FIG. 3(b) is a partial enlarged view of a peripheral region of the fixed member 22.

In a central mechanism 23 of a tire curing device shown in FIG. 4, a plurality of magnets 24 are attached at predetermined intervals onto the outer circumferential surface of the piston 6 attached to the center post rod 5. The reference signs of other components are the same as those in the hydraulically-driven central mechanism 1.

In the central mechanism 23, since a plurality of magnets 24 are attached at predetermined intervals, even when the center post rod 5 rotates in the circumferential direction, any of the magnets 24 is positioned close to the linear sensor 8. Therefore, even without using a ring-shaped magnet, accurate position detection is possible. In addition, the necessary quantity of magnets to be used for position detection can be reduced.

As described above, a direct acting mechanism of a tire curing device to which the present invention is applied can sufficiently perform positional control of a bladder extension height and a shaping height, and is applicable to tires of different sizes.

Also, a central mechanism of a tire curing device to which the present invention is applied can sufficiently perform positional control of a bladder extension height and a shaping height, and is applicable to tires of different sizes.

REFERENCE SIGN LIST

1: Hydraulically-driven central mechanism
2: Bag head
3: Hydraulic cylinder
4: Cylinder tube
5: Center post rod
6: Piston
7: Sensor hole portion
8: Linear sensor
9: Ring-shaped magnet
10: Linear sensor main body
11: Water channel hole portion
12: Arm portion
13: Cylinder guide
14: Central mechanism
15: Linear sensor
16: Hydraulic cylinder
17: Linear sensor main body
18: Magnet
19: Center post rod
20: Central mechanism
21: Magnet
22: Fixed member
23: Central mechanism
24: Magnet
25: Arm portion

What is claimed is:

1. A direct acting mechanism of a tire curing device, comprising:
   a clamp portion capable of clamping a bladder that can expand and contract;
   a thick-walled cylinder that is disposed below the clamp portion and formed into a hollow shape;
   a center post rod that is disposed in the hollow region of the cylinder, is movable in the vertical direction, and has an upper end attached to the clamp portion;
   a sensor portion disposed in a hole portion which is provided in a region between the inner circumferential surface and the outer circumferential surface of the cylinder, the opening of which penetrates to the bottom surface side of the cylinder, and capable of detecting magnetism; and
   a magnetic magnet portion attached to the center post rod.

2. The direct acting mechanism of a tire curing device according to claim 1, wherein
   the magnet portion has a ring shape, and is attached to the outer circumferential surface of the center post rod.

3. The direct acting mechanism of a tire curing device according to claim 1, further comprising:
   a bee drift mechanism that is in contact with the lower end of the cylinder and moves the cylinder in the vertical direction.

4. The direct acting mechanism of a tire curing device according to claim 1, wherein
   the center post rod is fixed so as not to rotate in the circumferential direction, and the magnet portion is attached to a position near the sensor portion of the center post rod.

5. The direct acting mechanism of a tire curing device according to claim 1, wherein
   a plurality of the magnet portions are attached to the outer circumferential surface of the center post rod, and the magnet portions adjacent to each other are at a predetermined interval.

6. The direct acting mechanism of a tire curing device according to claim 2, further comprising:
   a bee drift mechanism that is in contact with the lower end of the cylinder and moves the cylinder in the vertical direction.

7. The direct acting mechanism of a tire curing device according to claim 3, wherein
   the center post rod is fixed so as not to rotate in the circumferential direction, and the magnet portion is attached to a position near the sensor portion of the center post rod.

8. The direct acting mechanism of a tire curing device according to claim 6, wherein
   the center post rod is fixed so as not to rotate in the circumferential direction, and the magnet portion is attached to a position near the sensor portion of the center post rod.

9. The direct acting mechanism of a tire curing device according to claim 3, wherein
   a plurality of the magnet portions are attached to the outer circumferential surface of the center post rod, and the magnet portions adjacent to each other are at a predetermined interval.

10. The direct acting mechanism of a tire curing device according to claim 6, wherein
    a plurality of the magnet portions are attached to the outer circumferential surface of the center post rod, and the magnet portions adjacent to each other are at a predetermined interval.

11. A central mechanism of a tire curing device, comprising:
    a bladder that can expand and contract;
    a clamp portion capable of clamping the bladder;
    a thick-walled cylinder that is disposed below the clamp portion, has a hollow shape, and has a hole portion that is positioned in the vertical direction between the inner circumferential surface and the outer circumferential surface, and opened to the bottom surface side;
    a center post rod that is disposed in the hollow region of the cylinder, is movable in the vertical direction, and has an upper end attached to the clamp portion;
    a sensor portion that is disposed in the hole portion of the cylinder and capable of detecting magnetism; and
    a magnetic magnet portion attached to the center post rod.

* * * * *